(12) United States Patent  (10) Patent No.: US 9,179,135 B2
Kim et al.  (45) Date of Patent: Nov. 3, 2015

(54) DISPLAY APPARATUS AND METHOD FOR CONTROLLING THEREOF

(71) Applicant: SAMSUNG ELECTRONICS CO., LTD., Suwon-si (KR)

(72) Inventors: Hak-jae Kim, Yongin-si (KR); Hoon Choi, Yongin-si (KR); Seung-su Lee, Suwon-si (KR); Kyung-mi Ha, Suwon-si (KR); Ui-hyun Kim, Bucheon-si (KR); Kwang-min Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 345 days.

(21) Appl. No.: 13/731,193

(22) Filed: Dec. 31, 2012

(65) Prior Publication Data

US 2013/0169767 A1   Jul. 4, 2013

(30) Foreign Application Priority Data

Dec. 29, 2011  (KR) .................. 10-2011-0146556
Dec. 30, 2011  (KR) .................. 10-2011-0147296
Apr. 24, 2012  (KR) .................. 10-2012-0042801

(51) Int. Cl.
  *H04N 13/04*  (2006.01)
(52) U.S. Cl.
  CPC ....... *H04N 13/0429* (2013.01); *H04N 13/0434* (2013.01); *H04N 13/0438* (2013.01); *H04N 13/0445* (2013.01); *H04N 2013/0461* (2013.01)
(58) Field of Classification Search
  USPC .......................................... 348/55
  See application file for complete search history.

(56) References Cited

U.S. PATENT DOCUMENTS

2003/0017814 A1*  1/2003  Nagamura ................ 455/186.1
2007/0291172 A1*  12/2007  Kouzimoto et al. .......... 348/488

(Continued)

FOREIGN PATENT DOCUMENTS

EP         2 378 785 A2   10/2011
EP         2 385 706 A1   11/2011
KR    1020110115806 A    10/2011

OTHER PUBLICATIONS

Communication dated Jun. 13, 2013 issued by the Korean Intellectual Property Office in counterpart Korean Application No. 1020120042801.

(Continued)

*Primary Examiner* — Tracy Li
(74) *Attorney, Agent, or Firm* — Sughrue Mion, PLLC

(57) ABSTRACT

A display apparatus and a method for controlling thereof are provided. A display apparatus having a multi-view mode to concurrently provide different contents to different viewers includes a plurality of receivers operable in the multi-view mode to receive a plurality of different contents selected by multiple viewers, a video processor operable in the multi-view mode to process video data of the plurality of different contents received by the plurality of receivers; a video output which receives the video data processed by the video processor to display the plurality of different contents, an audio processor operable in the multi-view mode to process audio data corresponding to the selected contents, received by the receivers, and an audio output which outputs the processed audio data to a plurality of eyeglasses apparatuses for viewing the plurality of different contents, wherein a number of channels associated with the processed audio data output to the eyeglasses apparatus is different from a number of channels associated with the audio data received by the receivers.

20 Claims, 14 Drawing Sheets

(56) References Cited

U.S. PATENT DOCUMENTS

| | | | |
|---|---|---|---|
| 2008/0136906 A1* | 6/2008 | Park et al. | 348/114 |
| 2008/0240682 A1 | 10/2008 | Egawa et al. | |
| 2010/0007582 A1* | 1/2010 | Zalewski | 345/8 |
| 2011/0254934 A1 | 10/2011 | Yoon et al. | |
| 2012/0026157 A1* | 2/2012 | Unkel et al. | 345/419 |
| 2012/0057075 A1* | 3/2012 | Kabuto et al. | 348/564 |
| 2012/0170757 A1* | 7/2012 | Kraemer et al. | 381/17 |

OTHER PUBLICATIONS

Communication dated Jul. 20, 2015 issued by the European Patent Office in counterpart European Patent Application No. 12196167.6.

* cited by examiner

DISPLAY APPARATUS AND METHOD FOR CONTROLLING THEREOF

CROSS-REFERENCE TO RELATED APPLICATION(S)

This application claims priority under 35 U.S.C. §119 from Korean Patent Application Nos. 10-2011-0146556, 10-2011-0147296, and 10-2012-0042801, respectively filed on Dec. 29, 2011, Dec. 30, 2011, and Apr. 24, 2012, in the Korean Intellectual Property Office, the disclosures of which is incorporated herein by reference in its entirety.

BACKGROUND

1. Field

The present general inventive concept generally relates to a display apparatus and a method of controlling thereof, and more particularly, to a display apparatus which provides different types of content to a plurality of users, and a method for controlling thereof.

2. Description of the Related Art

Various types of electronic products have been developed and supplied with the development of electronic technology. In particular, various types of display apparatuses, such as a TV, a portable phone, a personal computer (PC), a notebook PC, a personal digital assistant (PDA), etc., have been used in most homes.

User needs for more functionality have increased with an increase in the use of display apparatuses. Therefore, efforts of makers to satisfy the needs of the users have increased, and thus products having new functions and providing 3D content, etc. have been developed.

Efforts to develop a display apparatus, which simultaneously displays a plurality of content to allow a plurality of users to view different types of content, have been made.

The display apparatus transmits audio signals of the plurality of content eyeglasses apparatus mapped with the plurality of content by wired or wireless transmission. However, in the case of a wired transmission method, transmission lines increase by the number of eyeglasses, and thus lines connecting the display apparatus to the eyeglasses apparatus increase, thereby causing a user inconvenience.

If the audio signals are transmitted according to the wireless transmission method, a bandwidth of a particular channel between the display apparatus and the eyeglasses apparatus is restricted. Therefore, levels of transmittable audio data signals are restricted. However, if the number of eyeglasses apparatus increases, a transmission amount of audio data of the particular channel increases and thus exceeds an allowable bandwidth of the particular channel.

In order to solve these problems, the display apparatus may be connected to the eyeglasses apparatus through a plurality of channels to transmit an audio signal. In this case, if a particular eyeglasses apparatus changes a content mode (e.g., changes a content view), an image may be immediately changed, but a change of the audio signal may be delayed.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a simultaneous output of audio data of a plurality of content.

The exemplary embodiments also provide a display apparatus which can reduce data sizes of a plurality of audio signals if the plurality of audio signals increase due to a change of an operation mode from a single view mode to a multi-view mode and simultaneously transmit the plurality of audio signals to an eyeglasses apparatus, and a method for controlling thereof.

According to an aspect of the exemplary embodiments, there is provided a display apparatus having a multi-view mode to concurrently provide different contents to different viewers, the display apparatus may include a plurality of receivers operable in the multi-view mode to receive a plurality of different contents selected by multiple viewers, a video processor operable in the multi-view mode to process video data of the plurality of different contents received by the plurality of receivers, a video output which receives the video data processed by the video processor to display the plurality of different contents, an audio processor operable in the multi-view mode to process audio data corresponding to the selected contents, received by the receivers, and an audio output which outputs the processed audio data to a plurality of eyeglasses apparatuses for viewing the plurality of different contents, wherein a number of channels associated with the processed audio data output to the eyeglasses apparatus may be different from a number of channels associated with the audio data received by the receivers.

The audio processor may process the audio data by converting surround sound audio data associated with 5.1 or more channels to two-channel-only stereo audio data before being wirelessly transmitted to the eyeglasses apparatuses.

The display apparatus may further include a controller which operates according to a mode selected from a single view mode and the multi-view mode and, if the multi-view mode is selected, controls operations of the plurality of receivers, the video processor and each component, and if audio data of the plurality of different content processed in the multi-view mode has less than a predetermined number of audio output channels, controls the audio processor to signal-process each audio data to a stereo audio signal.

The audio output may include the same number of audio outputs as the number of the audio signals.

The audio output may separately transmit the audio signals of the plurality of different content.

The audio output may perform communications with the plurality of eyeglasses apparatuses according to a wireless communication protocol, combine the audio signals of the plurality of different content according to a time-division method to generate an audio signal stream, and transmit the audio signal stream to the plurality of eyeglasses apparatuses.

The audio output may divide the audio signals of the plurality of different content and allocate the audio signals as patterns synchronizing with arrangement patterns of image frames of the plurality of different content to a plurality of time slots in order to generate the audio signal stream.

The display may further include an interface which performs pairing to perform communications with the plurality of eyeglasses apparatuses, wherein the audio output may transmit a plurality of audio signal streams processed by the audio processor to the plurality of eyeglasses apparatuses, respectively, through the interface.

According to another aspect of the exemplary embodiments, there is provided a method of controlling a display apparatus, the method including receiving a plurality of different content, detecting and processing video data of the plurality of different content, receiving the video data to arrange and display the plurality of different content in order to combine the plurality of different content in an image frame, signal-processing audio data of the plurality of different content, and outputting audio signals of the signal-processed audio data to a plurality of eyeglasses apparatuses corresponding to the plurality of different content, wherein the signal-processing may include if audio data of each content processed in the multi-view mode has more than a predetermined number of audio output channels in a multi-view mode operation, signal-processing each audio data to audio signal of 2 channels.

The receiving of the plurality of different content may include: if a multi-view mode selection command is input, receiving the plurality of different content, and the signal-processing of the audio data may include: if audio data of each content processed in the multi-view mode has the less than a predetermined number of audio output channels, signal-processing each audio data to a stereo audio signal.

The audio signals of the plurality of different content may be transmitted to the plurality of eyeglasses apparatuses corresponding to the plurality of different content through a plurality of audio outputs corresponding to the plurality of audio signals.

The audio signals of the plurality of different content may be separately transmitted through an audio output.

The audio signals of the plurality of different content may be combined according to a time-division method through an audio output which performs communications with the plurality of eyeglasses apparatuses to generate the audio signal stream and transmit the audio signal stream to the plurality of eyeglasses apparatuses.

The audio signals of the plurality of different content may be divided through the audio output and allocated as patterns synchronizing with arrangement patterns of image frames of the plurality of content to a plurality of time slots to generate the audio signal stream.

The method may further include performing pairing with the plurality of eyeglasses apparatuses to perform communications with the plurality of eyeglasses apparatuses, wherein the audio signal stream of the plurality of different content may be transmitted to the plurality of paired eyeglasses apparatuses.

According to another aspect of the exemplary embodiments, there is provided a eyeglasses apparatus which is interlocked with a display apparatus displaying a plurality of content views, including an interface unit which communicates with the display apparatus, a first shutter glasses unit, a second shutter glasses unit, a shutter glasses driver which drives each of the first and the second shutter glasses units based on a sync signal received from the display apparatus, a shutter glasses unit which drives a shutter in accordance with the driving signal, an input unit which receives a user command to select a content view, a controller which, if the user command is input, controls the shutter glasses driver to drive the first and the second shutter glasses units by synchronizing them with a content view selected by the user command from among the plurality of content views, and an audio output processor which receives an audio signal corresponding to the selected content view and output the audio signal.

The audio output processor may receive the audio signal by selecting an audio frequency channel corresponding to the user command from among a plurality of audio frequency channels output from the display apparatus.

The audio output processor may process an audio signal stream corresponding to the user command from among a plurality of audio signal streams transmitted from the display apparatus and output the processed audio signal stream.

The controller may select the plurality of content views sequentially whenever the user command is input.

The audio signal may be a stereo audio signal.

According to the above-described various exemplary embodiments, the display apparatus may simultaneously output audio data of a plurality of content. Therefore, a plurality of users who wear an eyeglasses apparatus may view different content through the eyeglasses apparatus.

In addition, if the display apparatus operates in a single view mode, the display apparatus may transmit a single audio signal as a stereo, which does not exceed a bandwidth of a corresponding channel. If the single view mode is changed to a multi-view mode, the display apparatus may reduce data sizes of a plurality of audio signals from stereo to mono and transmit the plurality of audio signals having the reduced data sizes so that the audio signals do not exceed a channel bandwidth. Also, the display apparatus may simultaneously transmit the plurality of audio signals to prevent the audio signals from being delayed if content are changed through the eyeglasses apparatuses.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
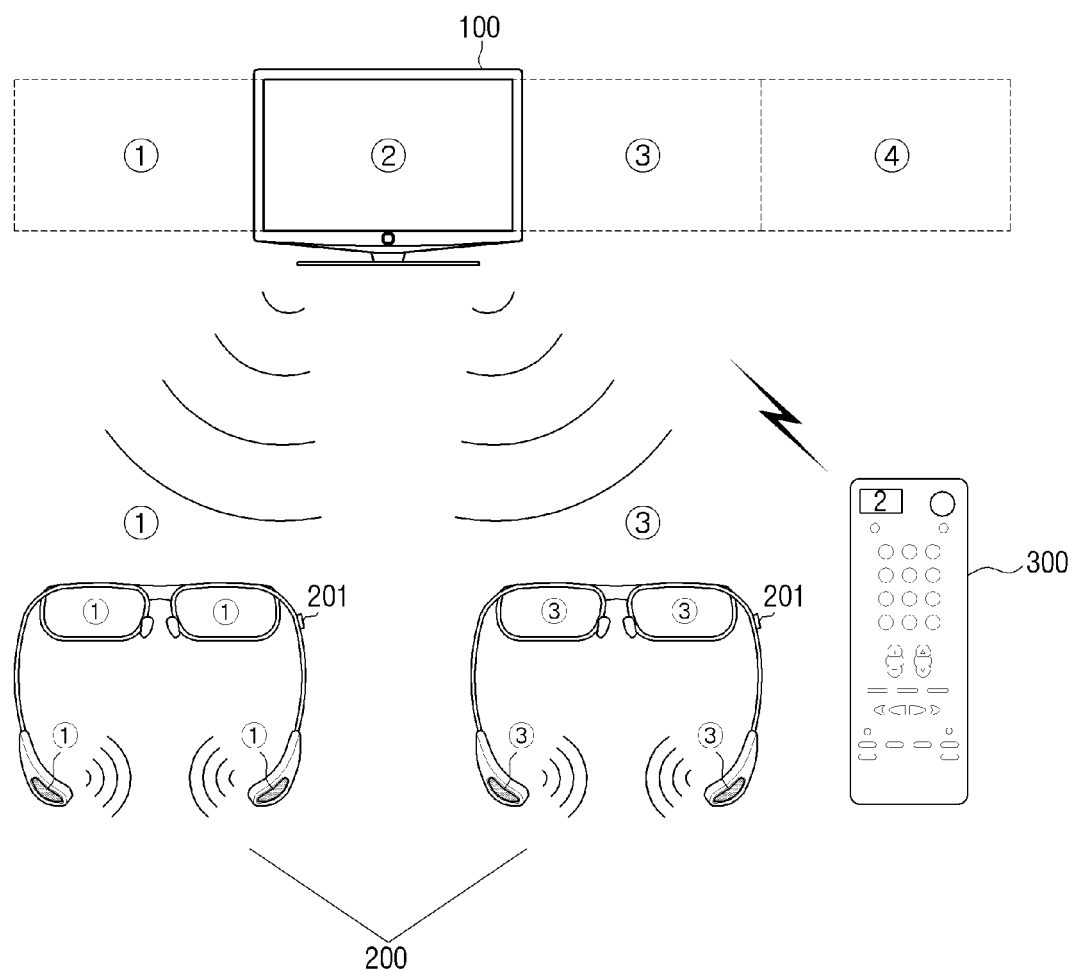
FIG. 1 is a view illustrating a system which provides a plurality of content to a plurality of users according to an exemplary embodiment

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a view illustrating a system which provides a plurality of content to a plurality of users according to an exemplary embodiment of the present general inventive concept.

As shown in FIG. 1, the system includes a display apparatus 100 and an eyeglasses apparatus 200.

The display apparatus 100 provides different content to a plurality of users in a multi-view mode. To this end, the display apparatus 100 alternately displays a plurality of content and transmits sync signals respectively corresponding to display timings of the plurality of content to the eyeglasses apparatus 200.

The display apparatus 100 outputs audio signals of the plurality of content to the eyeglasses apparatus 200 corresponding to the plurality of content. The display apparatus 100 may be realized as various types of apparatuses having display units such as a TV, a portable phone, a personal digital assistant (PDA), a notebook PC, a monitor, a tablet PC, an electronic book (e-book), an electronic frame, a kiosk PC, etc.

The eyeglasses apparatus 200 controls opening timings of left and right shutter glasses according to the sync signals received from the display apparatus 100. In other words, the eyeglasses apparatus 200 may open the left and right shutter glasses for a timing when the content are displayed to display a video image of one of the plurality of content, according to information of the received sync signals.

According to another exemplary embodiment, the eyeglasses apparatus 200 may open the left and right shutter glasses at a time when a first one of first through fourth content alternately displayed is displayed, according to the sync signals received from the display apparatus 100.

As described above, the eyeglasses apparatus 200 opens the left and right shutter glasses at the time when the first content is displayed. Therefore, a user wearing the eyeglasses apparatus 200 may view a video image of the first content of the plurality of content displayed on the display apparatus 100 through the eyeglasses apparatus 200.

The display apparatus 100 which alternately displays the first through fourth content outputs audio signals of the first through fourth content at a timing when the first through fourth content are displayed. Therefore, in the above-described exemplary embodiment, the eyeglasses apparatus 200 which opens the left and right shutter glasses at the time when the first content is displayed may receive and output an audio signal of the first content output in response to the timing when the first content is displayed. Therefore, the user may hear an audio of the first content simultaneously with viewing the video image of the first content through the eyeglasses apparatus 200.

Another eyeglasses device 200 may open the left and right shutter glasses at a time when the third one of the first through fourth content alternately displayed is displayed, according to the sync signals received from the display apparatus 100. The display apparatus 100 which alternately displays the first through fourth content outputs the audio signals of the first through fourth content in response to the timing when the first through fourth content are displayed. Therefore, the eyeglasses apparatus 200 which opens the left and right shutter glasses at the time when the third content is displayed may receive and output the audio signal of the third content output in response to the timing when the third content is displayed. As a result, the user may hear an audio of the third content with viewing a video image of the third content through the eyeglasses apparatus 200.

The user who is viewing a video image of one of the plurality of content through the eyeglasses apparatus 200 may control an input button 201 of the eyeglasses apparatus 200 to adjust an audio size of the content that the user is currently viewing. Also, the user may change a channel of the content currently viewed by the user to another channel or may control a content provided from an external device to be viewed. However, the present general inventive concept is not limited thereto, and thus the user may input a control command by using a remote control device 300 such as a remote controller to adjust the audio size of the currently viewed content or change the channel of the currently viewed content to another channel.

Meanwhile, the display apparatus 100 which outputs an audio signal regarding contents 1 to 4 to the eyeglasses apparatus 200 may output each audio signal as a stereo audio signal of two channels or a channel corresponding to the output channel depending on an output channel.

For example, if the display apparatus 100 has 5.1 channels, the display apparatus 100 may output only an audio signal regarding a specific channel (for example, a left right channel of the display apparatus 100), i.e. 2 channels, from among 5.1 channels. That is, the display apparatus 100 may calculate an average of audio signals output through the left right channel from among 5.1 channels and transmit the calculated average audio signal to the eyeglasses apparatuses 200.

Figure 2:
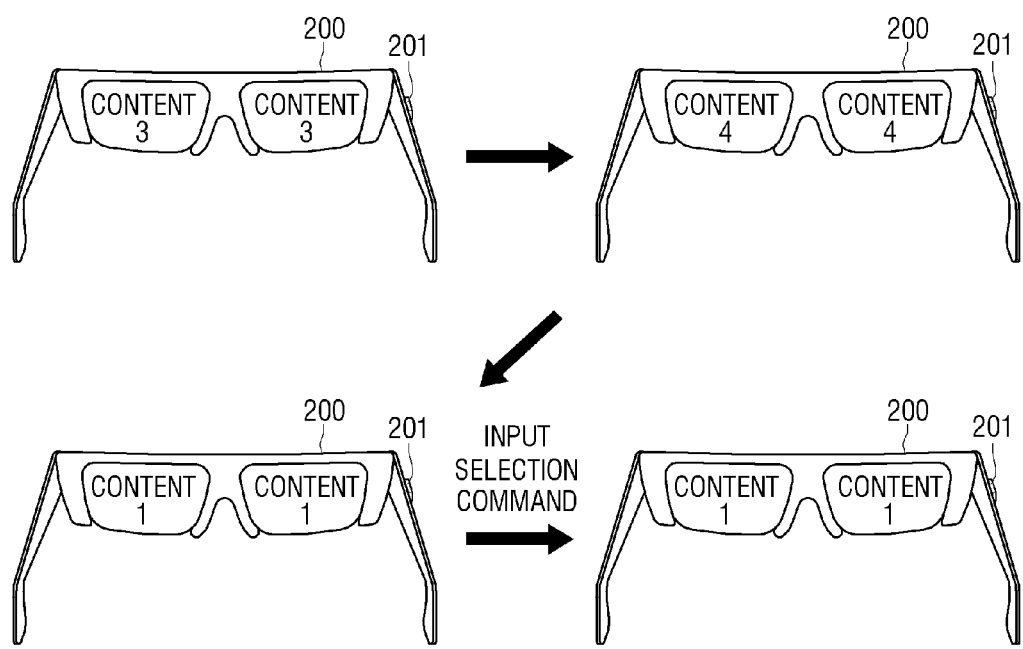
FIG. 2 is a view illustrating an eyeglasses apparatus which changes content according to an exemplary embodiment.

FIG. 2 is a view illustrating an eyeglasses apparatus which changes content according to an exemplary embodiment of the present general inventive concept.

As shown in FIG. 2, a user may select an input button 201 of an eyeglasses apparatus 200 to change content. For example, the user who is viewing a second content through the eyeglasses apparatus 200 presses the input button 201 of the eyeglasses apparatus 200 to change content. Therefore, the eyeglasses apparatus 200 may change content in an order of third content->fourth content->first content according to the number of times of the input button 201 being pressed by the user. According to another example, if the user presses the input button 201 of the eyeglasses apparatus 200, the eyeglasses apparatus 200 is set to a content change mode. As a result, the user who wears the eyeglasses apparatus 200 may sequentially view the third content, the fourth content, and the first content. Here, sequential viewing of content refers to sequential displaying of the third, fourth, and first content at predetermined time intervals.

As described above, if the user inputs a selection command through the input button 201 of the eyeglasses apparatus 200 in a state of automatically changing content, the eyeglasses apparatus 200 may synchronize with a content corresponding to a time when the selection command is input, to turn on both left and right shutter glasses. If the content corresponding to the time when the selection command is input from the user is the first content, the eyeglasses apparatus 200 may synchronize with a time when the first content is displayed, to turn on the left and right shutter glasses. As a result, the user may select and view the first content.

The system including the display apparatus 100 and the eyeglasses apparatus 200 has been described in brief. Here, the display apparatus 100 provides a plurality of content, and the eyeglasses apparatus 200 which is used to view the plurality of content provided from the display apparatus 100. Operations of elements of the display apparatus 100 and the eyeglasses apparatus 200 will now be described in detail.

Figure 3:
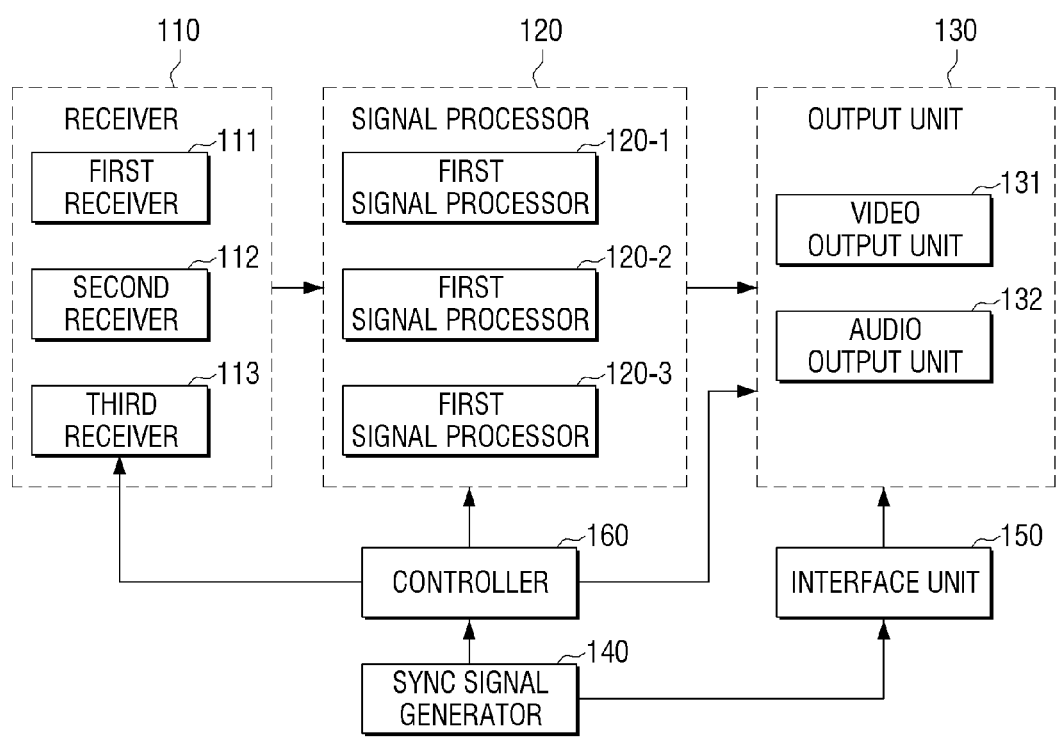
FIG. 3 is a block diagram of a display apparatus according to an exemplary embodiment.

FIG. 3 is a block diagram of a display apparatus according to an exemplary embodiment of the present general inventive concept.

As shown in FIG. 3, the display apparatus includes a receiver 110, a signal processor 120, an output unit 130 (e.g., output), a sync signal generator 140, an interface unit 150 (e.g., interface), and a controller 160.

The receiver 110 includes a plurality of receivers and receives a plurality of content selected by a plurality of users in a multi-view mode.

First and second receivers 111 and 112 may receive content through different broadcast channels. If the first and second receivers 111 and 112 receive the content through the different broadcast channels as described above, each of the first and second receivers 111 and 112 may include elements such as a tuner (not shown), a modulator (not shown), an equalizer (not shown), a decoder (not shown) etc. The elements of the first and second receivers are well-known techniques, and thus descriptions of their operations will be omitted.

A third receiver 113 may receive content through a player, such as a source device or a digital versatile disk (DVD) device such as a web server, through at least one of SCART, AV, HDMI, COMPONENT, and USB interfaces. If different types of content are received through the first, second, and third receivers 111, 112, and 113 as described above, the signal processor 120 performs signal-processing in the multi-view mode so as to output video data and audio data of each of the different types of content received through the first, second, and third receivers 111, 112, and 113 to the output unit 130. Accordingly, the output unit 130 may output the signal-processed video data and audio data of each of the different types of content through a video output unit 131 and an audio output unit 132. Here, elements of the output unit 130 will be described in detail later, and elements of the signal processor 120 will now be described in detail with reference to FIG. 4.

Figure 4:
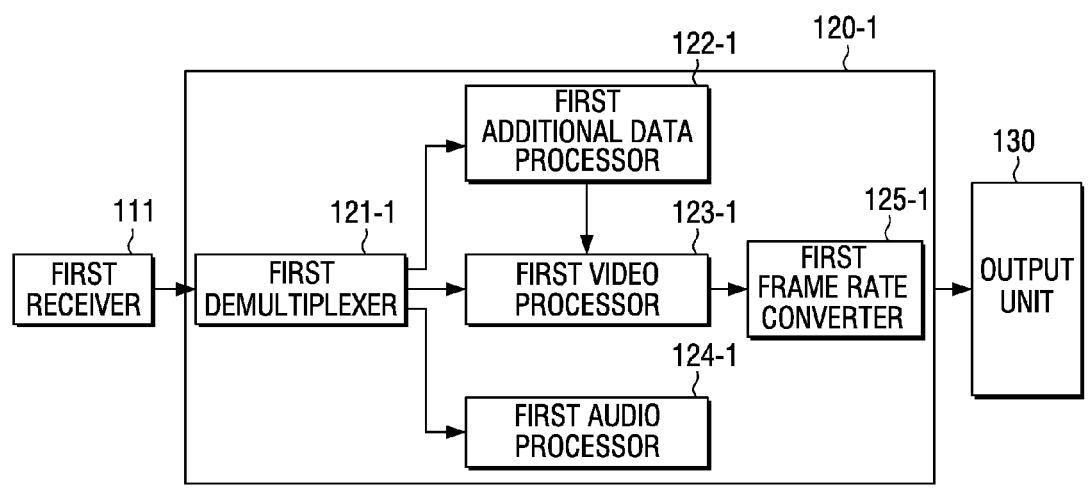
FIG. 4 is a block diagram illustrating a signal processor of the display apparatus, according to an exemplary embodiment.

FIG. 4 is a block diagram illustrating the signal processor 120 of the display apparatus, according to an exemplary embodiment of the present general inventive concept.

Before the signal processor 120 is described with reference to FIG. 4, the number of elements of the signal processor 120 may correspond to the number of elements of the receiver 110. If the receiver 110 includes the first, second, and third receivers 111, 112, and 113 as described above, the signal processor 120 may include the same number of elements as the number of receivers 111, 112, and 113 to perform signal-processing with respect to content respectively received from the first, second, and third receivers 111, 112, and 113. In other words, the signal processor 120 may include first, second, and third signal processors 120-1, 120-2, and 120-3, and the first signal processor 120-1 may perform signal-processing with respect to the content received from the first receiver 111. The second signal processor 120-2 may perform signal-processing with respect to the content received from the second receiver 112, and the third signal processor 120-3 may perform signal-processing with respect to the content received from the third receiver 113.

However, the present general inventive concept is not limited thereto, and thus the signal processor 120 may include a single element to perform signal-processing with respect to the different types of content respectively received from the first, second, and third receivers 111, 112, and 113.

In the present general inventive concept, operations of the first, second, and third signal processors 120-1, 120-2, and 120-3 for performing signal-processing with respect to received content will be described. Also, the first, second, and third signal processors 120-1, 120-2, and 120-3 have the same structures, and thus an operation of the first signal processor 120-1 will now be described in detail.

As shown in FIG. 4, the first signal processor 120-1 includes a first demultiplexer 121-1, a first additional data processor 122-1, a first video processor 123-1, a first audio processor 124-1, and a first frame rate converter 125-1. Although only the first signal processor 120-1 is illustrated in FIG. 4, the signal processors 120-2, and 120-3 may be realized in a structure equal to or similar to the structure of the first signal processor 120-1 shown in FIG. 4.

Here, when the first demultiplexer 121-1 operates in a multi-view mode, the first demultiplexer 121-1 may respectively allocate additional data, video data, and audio data of each content to a first additional data processor 122-1, a first video processor 123-1, and a first audio processor 124-1. In other words, the first demultiplexer 121-1 may divide additional data, video data, and audio data from a content received from the first receiver 111 corresponding to the first demultiplexer 121-1 and respectively transmit the additional data, the video data, and the audio data to the first additional data processor 122-1, the first video processor 123-1, and the first audio processor 124-1.

If the content includes additional information such as an Electronic Program Guide (EPG) and subtitles, the first additional data processor 122-1 may add the additional data divided by the first demultiplexer 121-1 to an image frame corresponding to the additional data.

The first video processor 123-1 performs signal-processing with respect to the video data of the content received from the first demultiplexer 121-1. In detail, if the video data is received from the first demultiplexer 121-1, the first video processor 123-1 performs decoding with respect to the received video data through a decoder (not shown) and then performs upscaling or downscaling with respect to an image frame of the decoded video data through a scaler (not shown) according to a screen size of the video output unit 131.

The first video processor 123-1 may convert the video data into a data format corresponding to the first frame rate converter 125-1. In detail, if an input video data is a top-to-bottom format, and the first frame rate converter 125-1 processes a frame in a side-by-side format, the first video processor 123-1 may connect of image frames of each content to one another side by side in a horizontal direction to convert the frame into the side-by-side format.

The first audio processor 124-1 performs signal-processing with respect to the audio data of the content received from the first demultiplexer 121-1. In detail, the first audio processor 124-1 performs decoding with respect to the audio data through a decoder (not shown) and modulates the decoded audio data into different frequency signals through a modulator (not shown). Here, an audio signal modulated through the first audio processor 124-1 may have a different frequency channel from an audio signal modulated through another audio processor.

Meanwhile, the first audio processor 124-1 may output audio data included in contents received from the first demultiplexer 121-1 according to the number of audio output channels, or convert the audio data into a stereo audio signal and output the stereo audio signal.

That is, if the number of audio output channels of audio data included in contents received from the first demultiplexer 121-1 is 5.1 channels or more, the first audio processor 124-1 may convert the audio data into a stereo audio signal of 2 channels and output the stereo audio signal. Or, if the number of audio output channels of audio data included in contents received from the first demultiplexer 121-1 is less than 5.1 channels, the first audio processor 124-1 may convert the audio data into a stereo audio signal corresponding to the number of the audio output channels and output the stereo audio signal.

The first audio processor 124-1 will be explained later in greater detail.

The first frame rate converter 125-1 converts a frame rate of the content provided from the first video processor 123-1 into a multi-content display rate with reference to an output rate of the display apparatus 100. In detail, if the display apparatus 100 operates in a frequency of 60 Hz, the first frame rate converter 125-1 may converter a frame rate of each content into n×60 Hz.

As described above, the output unit 130 outputs video data and audio data of each of content respectively signal-processed by the first, second, and third signal processors 120-1, 120-2, and 120-3 and includes the video output unit 131 and the audio output unit 132. The video output unit 131 combines image frames of the content respectively output through the first, second, and third signal processors 120-1, 120-2, and 120-3 to display a multi-content frame. Here, the multi-content frame refers to frame data which is formed to allow a plurality of users to view video images of a plurality of content.

According to an exemplary embodiment, if the display apparatus is a shutter glass type display apparatus, the video output unit 131 performs multiplexing to alternately arrange the image frames of the content respectively output from the first, second, and third signal processors 120-1, 120-2, and 120-3 at least one by one. The video output unit 131 upscales the image frames of the multiplexed content according to the screen size and combines the image frames of the multiplexed content to form and display the multi-content frame.

As described above, if a multi-content frame formed of a combination of image frames of a plurality of content is displayed, each of a plurality of users may view video images of different types of content through the eyeglasses apparatus 200 that each of the plurality of users wears. In detail, the eyeglasses apparatus 200 includes the left and right shutter glasses. If an image frame of a 3D content is output through the video output unit 131, the eyeglasses apparatus 200 alternately turns on/off the left and right shutter glasses. If a multi-content frame is output through the video output unit 131 as described above, the eyeglasses apparatus 200 simultaneously turns on/off the left and right shutter glasses according to an output timing of a content synchronizing with the eyeglasses apparatus 200.

Since the eyeglasses apparatus 200 simultaneously turns on/off the left and right shutter glasses as described above, a user who wears the eyeglasses apparatus 200 may view a video image of content different from a content viewed by another user.

However, the present general inventive concept is not limited thereto. Therefore, if the display apparatus is realized as a polarization glass type display apparatus, the video output unit 131 performs multiplexing to horizontally, vertically, or orthogonally mix image frames of content respectively output from the first, second, and third signal processors 120-1, 120-2, and 120-3. After that, the video output unit 131 upscales the image frames of the multiplexed content according to the screen size to combines the image frames in order to form and display a multi-content frame.

In this case, the eyeglasses apparatus 200 may be a polarization eyeglasses apparatus, and a plurality of users may view different types of content through polarization eyeglasses apparatuses that the plurality of users respectively wears.

In the above-described shutter glass type display apparatus, a mode for alternately arranging and displaying image frames of content may be referred to as a multi-view mode or a dual view mode. Hereinafter, the mode will be as the multi-view mode. As described above, if the display apparatus 100 providing a plurality of content operates in a general mode (or a single view mode) for displaying only one of 2D and 3D content, only one of the first, second, and third receivers 111, 112, and 113 may be activated to process content.

The above-described content may be 2D or 3D content. Here, the 3D content refer to content which give a stereoscopic effect to a user by using a multi-view image formed by expressing the same object in different views. If a plurality of 3D content are used, the video output unit 131 may multiplex left and right eye images of 3D content, which are respectively provided from frame rate converters of the first, second, and third signal processors 120-1, 120-2, and 120-3, in a preset arrangement form and alternately arrange the left and right eye images along with image frames of other content. Therefore, left and right eye images of a first content, left and right eye images of a second content, . . . , and left and right eye images of an nth content are sequentially arranged and displayed, and a user recognizes left and right eye images of one content through the eyeglasses apparatus 200.

The audio output unit 132 may transmit an audio signal to a single channel speaker or a multichannel speaker such as 5.1 channels and 7.1 channels to output an audio to an outside. Alternatively, the audio output unit 132 may transmit the audio signal to the eyeglasses apparatus 200 through the interface unit 150 which will be described later. In other words, each audio data output from the audio output unit 132 may be provided to a user through an output means such as earphones of the eyeglasses apparatus 200 or may output through the single channel speaker or the multichannel speaker of the display apparatus 100. The number of channels related to each audio data output to the eyeglasses apparatus 200 may be different from the number of channels of audio data included in contents received through the receiver 110 including a plurality of receivers.

The audio output unit 132 will be described in detail later.

If the eyeglasses apparatus 200 operates in the single view mode or the multi-view mode selected by the user, the controller 160 controls the first, second, and third receivers 111, 112, and 113 and elements, i.e., the signal output unit 120 and the output unit 130, to receive a plurality of content. In detail, if a selection command to select the single view mode is input from the user, the controller 160 controls the first, second, and third receivers 111, 112, and 113 to receive only one of the plurality of content. Also, the controller 160 controls the signal processor 120 to perform signal-processing with respect to a content received from one of the first, second, and third receivers 111, 112, and 113. For example, if a content is received from the first receiver 111, the controller 160 controls the first signal processor 120-1 corresponding to the first receiver 111 to perform signal-processing with respect to video data and audio data of the corresponding content. The controller 160 controls the output unit 130 to output the video data and the audio data signal-processed by the first signal processor 120-1 through the video output unit 131 and the audio output unit 132.

If a selection command to select the multi-view mode is input from the user, the controller 160 controls the first, second, and third receivers 111, 112, and 113 to receive a plurality of content. Also, the controller 160 controls the first, second, and third signal processors 120-1, 120-2, and 120-3 respectively corresponding to the first, second, and third receivers 111, 112, and 113 to perform signal-processing with respect to video data and audio data of content. In accordance with a control command of the controller 160, each of the first video processor 123-1 included in the first signal processor 120-1 and a video processor included in the remaining signal processors performs signal processing with respect to video data included in each content received through the first to the third receivers 111-113 to be in the form that can be output.

Meanwhile, if audio data of each content has more than a predetermined number of audio output channels, the controller 160 may perform signal processing with respect to each audio data to a stereo audio signal of 2 channels, and if audio data of each content has less than a predetermined number of audio output channels, the controller 160 may control the first audio processor 124-1 and the remaining audio processors to signal-process each audio data to a stereo audio signal corresponding to the number of the channels.

Therefore, each of the first audio processor 124-1 and the remaining audio processors may perform signal processing with respect to audio data of each content to a stereo audio signal.

Hereinafter, the operation of performing signal processing with respect to audio data to a stereo audio signal of 2 channels in the first audio processor 124-1 if there are more than a predetermined number of audio output channels will be explained.

Figure 5:
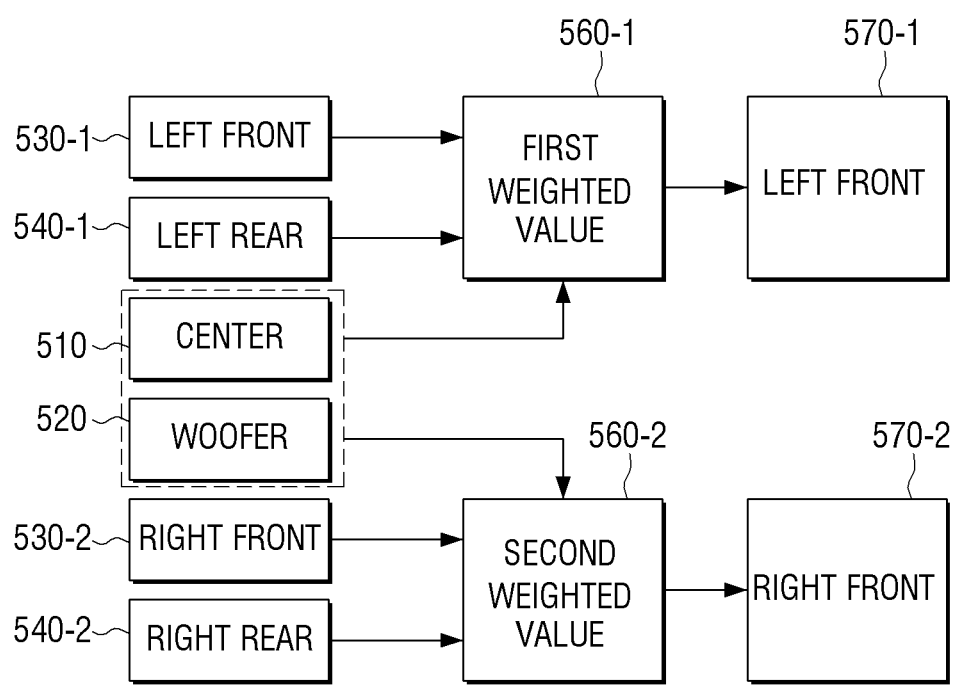
FIG. 5 is a block diagram illustrating that an audio processor performs signal-processing to audio data having 5.1 channels into a stereo audio signal of two channels according to an exemplary embodiment.
Figure 6:
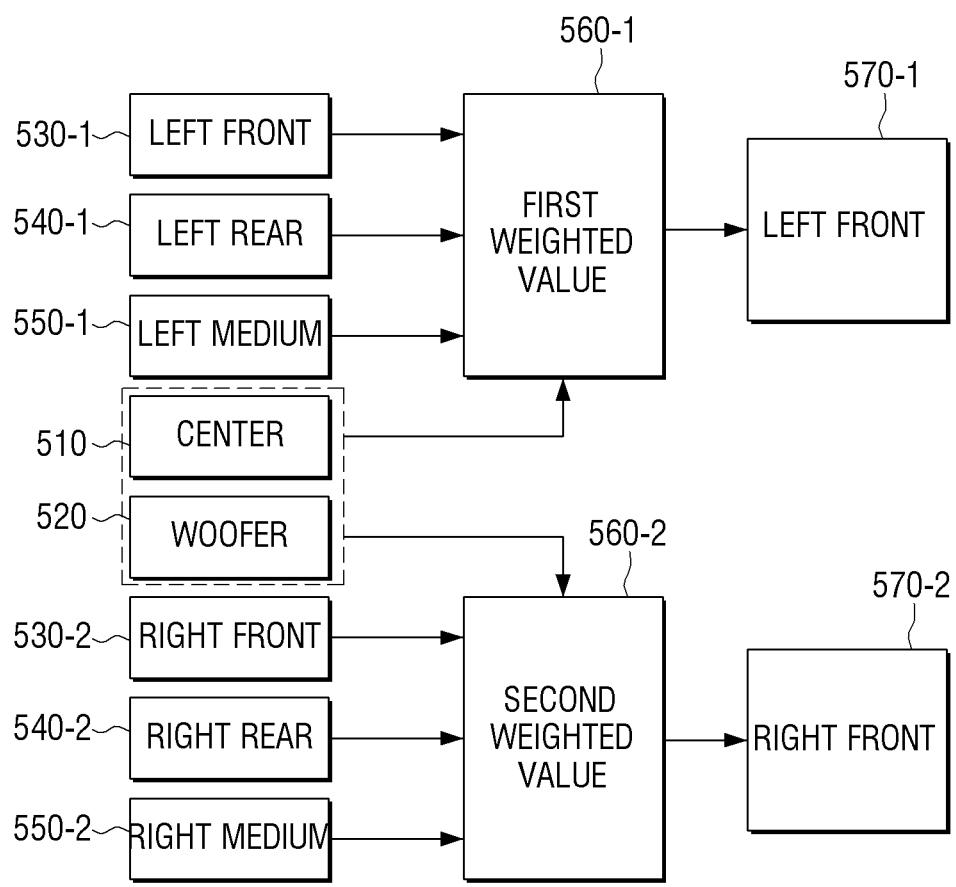
FIG. 6 is a block diagram illustrating that an audio processor performs signal-processing to audio data having 7.1 channels into a stereo audio signal of two channels according to another exemplary embodiment.

FIG. 5 is a block diagram illustrating that an audio processor performs signal-processing to audio data having 5.1 channels into a stereo audio signal of 2 channels according to an exemplary embodiment, and FIG. 6 is a block diagram illustrating that an audio processor performs signal-processing to audio data having 7.1 channels into a stereo audio signal of 2 channels according to another exemplary embodiment.

As described above, the first signal processor 120-1 comprises the first audio processor 124-1, and the first audio processor 124-1 performs signal processing with respect to audio data included in contents received through the first receiver 111.

As such, the first audio processor 124-1 may perform signal processing with respect to audio data included in contents received through the first receiver 111 to a stereo audio signal according to the number of audio output channels and output the signal-processed signal.

Specifically, as illustrated in FIG. 5, the audio output unit 132 of the display apparatus 100 may output an audio signal to six speakers (a center 510, a woofer 520, a left right fronts 530-1, 530-2, and left right rears 540-1, 540-2) through 5.1 channels. As such, if an audio signal is output to six speakers through 5.1 channels, the first audio processor 124-1 performs signal processing with respect only to audio data regarding a specific channel (for example, a channel corresponding to the left right fronts 530-1, 530-2) from among 5.1 channels. That is, the first audio processor 124-1 applies a weighted average only to audio data regarding a specific channel (the left right fronts 530-1, 530-2) from among 5.1 channels through first and second weighted value units 560-1, 560-2 and performs signal processing thereof. Accordingly, the audio output unit 132 may apply a weighted average to an audio signal output through two channels, that is, the left front 530-1 and the right front 530-2 from among 5.1 channels and output the audio signal.

Meanwhile, as illustrated in FIG. 6, the audio output unit 132 of the display apparatus 100 may output an audio signal to eight speakers (the center 510, the woofer 520, the left right fronts 530-1, 530-2, and the left right rears 540-1, 540-2, and left right mediums 550-1, 550-2) through 7.1 channels. As such, if an audio signal is output to eight speakers through 7.1 channels, the first audio processor 124-1 if an audio signal is output to six speakers through 5.1 channels, the first audio processor 124-1 performs signal processing with respect only to audio data regarding a specific channel (for example, a channel corresponding to the left right rears 540-1, 540-2) from among 7.1 channels. That is, the first audio processor 124-1 applies a weighted average only to audio data regarding a specific channel (the left right rears 540-1, 540-2) from among 7.1 channels through the first and second weighted value units 560-1, 560-2 and performs signal processing thereof. Accordingly, the audio output unit 132 may apply a weighted average to an audio signal output through two channels, that is, the left rear 540-1 and the right rear 540-2 from among 7.1 channels and output the audio signal.

The controller 160 controls the output unit 130 to output the video data and the audio data signal-processed by the first, second, and third signal processors 120-1, 120-2, and 120-3 through the video output unit 131 and the audio output unit 132. According to a control command of the controller 160, the video output unit 131 arranges and displays the video data signal-processed by the first, second, and third signal processors 120-1, 120-2, and 120-3 to combine the video data in the image frame unit. According to a control command of the controller 160, the audio output unit 132 converts audio signals respectively signal-processed by the first, second, and third signal processors 120-1, 120-2, and 120-3 into one audio stream and transmit the audio stream through one channel. Alternatively, the audio output unit 132 may output the signal-processed audio signals through a plurality of channels without an additional conversion.

In detail, if the audio processors 124 of the first, second, and third signal processors 120-1, 120-2, and 120-3 do not reduce the signal-processed audio signals in sizes appropriate for stereo audio signals of 2 channels, the audio output unit 132 may output the signal-processed audio signals through a plurality of channels.

If the audio processors 124 of the first, second, and third signal processors 120-1, 120-2, and 120-3 reduce the signal-processed audio signals in the sizes appropriate for the stereo audio signals of 2 channels, the audio output unit 132 may convert the audio signals having the reduced sizes into one audio stream and output the audio stream through a single channel.

Referring to FIG. 2 again, the sync signal generator 140 generates sync signals, which are to synchronize the eyeglasses apparatuses 200 respectively corresponding to the content, according to display timings of the content. In other words, the sync signal generator 140 generates sync signals which are to synchronize the eyeglasses apparatuses 200 at display timings of image frames of the content in the multi-view mode.

The interface unit 150 transmits the sync signals generated by the sync signal generator 140 to the eyeglasses apparatuses 200. In this case, the interface unit 150 may transmit the sync signals to the eyeglasses apparatuses 200 according to various methods.

According to an exemplary embodiment, the interface unit 150 may include a Bluetooth communication module to communicate with the eyeglasses apparatuses 200, and generate the sync signals generated by the sync signal generator 140 as a transmission packet according to Bluetooth communication standards and transmit the transmission packet to the eyeglasses apparatuses 200. In this case, the transmission packet includes time information which synchronizes with display timings of a plurality of content to turn on/off the left and right shutter glasses of the eyeglasses apparatus 200. In detail, the time information of the transmission packet may include information about a left shutter open offset time for turning on the left shutter glass of the eyeglasses apparatus 200, a left shutter close offset time for turning off the left shutter glass, a right shutter open offset time for turning on the right shutter glass, and a right shutter open close offset time for turning off the right shutter glass.

An offset time is delay information from a reference time set for each content to a time when left and right shutter glasses are turned on or off. In other words, after the offset time elapses from the reference time, the eyeglasses apparatus 200 turns on/off the left and right shutter glasses. For example, the reference time may be a time when a vertical sync signal (i.e., a frame sync) is generated from an image frame. Information about the reference time may be included in a transmission packet, and the eyeglasses apparatus 200 may set a time when the vertical sync signal for turning on/off the left and right shutter glasses is generated, based on the information about the reference time included in the received transmission packet.

The interface unit 150 receives a Bluetooth device address, a pin code, etc. and performs pairing according to a Bluetooth communication method. If the pairing is completed, the interface unit 150 may register information about each of the eyeglasses apparatuses 200, e.g., identification information, etc. of the eyeglasses apparatus 200. After that, the interface unit 150 my match a display timing of each content with information about the eyeglasses apparatus 200 and transmit the transmission packet to the corresponding eyeglasses apparatus 200 based on the identification information acquired through the pairing.

The eyeglasses apparatus 200 may receive the transmission packet, check a display timing based on the information of the transmission packet, and turn on/off the left and right shutter glasses according to the checked display timing.

For example, when image frames of first and second content are alternately displayed, the interface unit 150 may generate a sync signal generated by the sync signal generator 140 as a transmission packet according to Bluetooth communication standards and transmit the transmission packet to the first and second eyeglasses apparatuses 200. A transmission packet transmitted to the first eyeglasses apparatus 200 includes time information for turning on the left and right shutter glasses of the first eyeglasses apparatus 200 at a display timing of the first content and information about a reference time. A transmission packet transmitted to the second eyeglasses apparatus 200 includes time information for turning on the left and right shutter glasses of the second eyeglasses apparatus 200 at the display timing of the first content and information about a reference time.

Therefore, based on the information of the received transmission packet, the first eyeglasses apparatus 200 may turn on the left and right shutter glasses at the display timing when an image frame of the first content is displayed and may turn off the left and right shutter glasses at a display timing when an image frame of a second content is displayed Based on the information of the received transmission packet, the second eyeglasses apparatus 200 may turn on the left and right shutter glasses at the display timing when the image frame of the second content is displayed and turn off the left and right shutter glasses at the display timing when the image frame of the first content is displayed.

Therefore, a user who wears the first eyeglasses apparatus 200 may view a video image of the first content, and a user who wears the second eyeglasses apparatus 200 may view a video image of the second content.

According to another exemplary embodiment, the interface unit 150 may provide an infrared (IR) sync signal or a radio frequency (RF) sync signal having different wireless frequency channels to the eyeglasses apparatus 200. In this case, the eyeglasses apparatus 200 may receive a sync signal having a particular frequency and turn on or off the left and right shutter glasses according to a display timing of a content corresponding to the sync signal.

In this case, based on information of the sync signal, the interface unit 150 may transmit an IR signal to the eyeglasses apparatus 200, wherein a high level of a first period alternates with a low level of a second period at preset time intervals. Therefore, the eyeglasses apparatus 200 may turn on the left and right shutter glasses for the first period which is on the high level and turn off the left and right shutter glasses for the second period which is on the low level. Also, the sync signal may be generated according to various methods.

In the above-described exemplary embodiment, the interface unit 150 and the eyeglasses apparatus 200 communicate with each other according to a Bluetooth communication method or an IR or RF method, but this is only an exemplary embodiment. In other words, besides the Bluetooth communication method, a communication method, such as an IR communication method, a Zigbee communication method, or the like, may be used. The interface unit 150 and the eyeglasses apparatus 200 may communicate with each other according various types of wireless communication methods which are to form a communication channel in a local area in order to transmit a signal.

Figure 7:
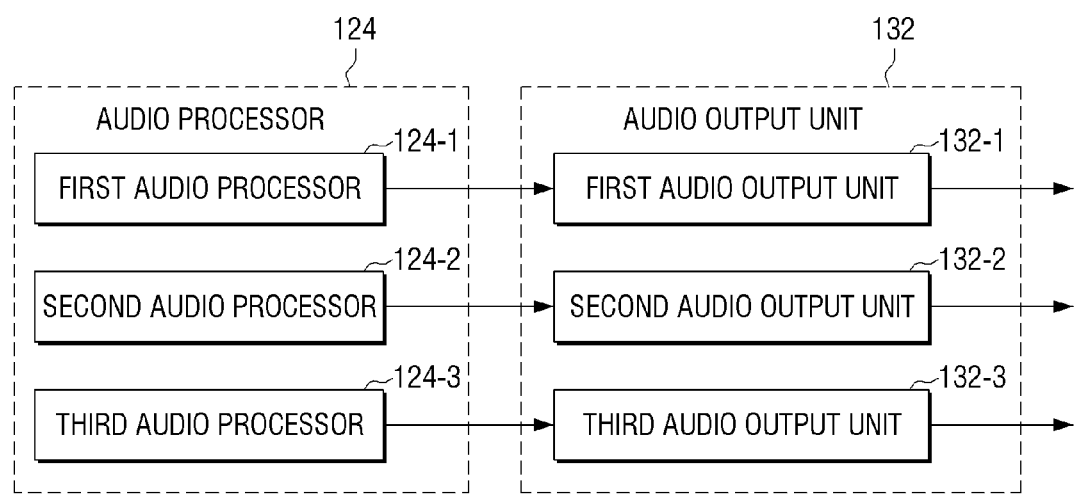
FIG. 7 is a block diagram illustrating a plurality of audio output units according to an exemplary embodiment.

The audio output unit 132 which has been described above outputs audio signals of content respectively signal-processed by first, second, and third audio processors 124-1, 124-2, and 124-3 of the first, second, and third signal processors 120-1, 120-2, and 120-3 to a plurality of eyeglasses apparatuses 200 corresponding to the content. Referring to FIGS. 5 through 7, the audio output unit 132 may output audio data of a plurality of content to a plurality of eyeglasses apparatuses 200 corresponding to the plurality of content.

FIG. 7 is a block diagram illustrating a plurality of audio output units according to an exemplary embodiment of the present general inventive concept.

As shown in FIG. 7, the audio output unit 132 may include the same number of elements as the number of elements of the audio processor 124 which processes audio data of each content. According to an exemplary embodiment, if first through third content are received, the first, second, and third signal processors 120-1, 120-2, and 120-3 may modulate audio data of the first through third content into audio signals having different frequency channels through the first, second, and third audio processors 124-1, 124-2, and 124-3 and output the audio signals.

Herein, each audio signal output from the first, second, and third signal processors 120-1, 120-2, and 120-3 has been modulated to a stereo audio signal of 2 channels or corresponding to the number of audio output channels according to the number of audio output channels as described above.

If the modulated audio signals having the different frequency channels are output, first, second, and third audio output units 132-1, 132-2, and 132-3 may transmit the audio signals of the first through third content to eyeglasses apparatuses 200 corresponding to the first through third content.

According to an exemplary embodiment, the first, second, and third audio output units 132-1, 132-2, and 132-3 may output the audio signals of the first through third content to the eyeglasses apparatuses 200 by using a Bluetooth communication method which is a wireless communication method. In detail, the first, second, and third audio output units 132-1, 132-2, and 132-3 generate the audio signals of the first through third content as audio signal streams which comply with Bluetooth communication standards. The first, second, and third audio output units 132-1, 132-2, and 132-3 may transmit the audio signal streams to a plurality of eyeglasses apparatuses 200 based on identification information of the plurality of eyeglasses apparatuses 200 which are paired through the interface unit 150.

Therefore, the plurality of eyeglasses apparatuses 200 receive one of the audio signal streams output through the first, second, and third audio output units 132-1, 132-2, and 132-3 and output the one audio signal stream through a speaker. As a result, users wearing the eyeglasses apparatuses 200 may hear the audio of currently viewed content through speakers of the eyeglasses apparatuses 200 when viewing video images of the currently viewed content.

According to another exemplary embodiment, the first, second, and third audio output units 132-1, 132-2, and 132-2 may output the audio signals of the first through third content to the eyeglasses apparatuses 200 according to an RF communication method. As described above, the audio signals of the first through third content may be modulated into signals having different frequency channels. If the audio signals of the first through third content are respectively output through the first, second, and third audio processors 124-1, 124-2, and 124-3, the first, second, and third audio output units 132-1, 132-2, and 132-3 may output the audio signals through frequency channels corresponding to the audio signals.

In this case, a user wears the eyeglasses apparatus 200 may select a frequency channel by using a control button of the eyeglasses apparatus 200. According to the selection of the frequency channel, the eyeglasses apparatus 200 may receive an audio signal output through the selected frequency channel and output the audio signal through a speaker, so that a user hears an audio related to a content that the user is currently viewing.

In the above-described exemplary embodiment, audio signals are output according to a Bluetooth communication method or an RF communication method, but this is only an exemplary embodiment. Therefore, the audio signals may be output according to another communication method.

Figure 8:
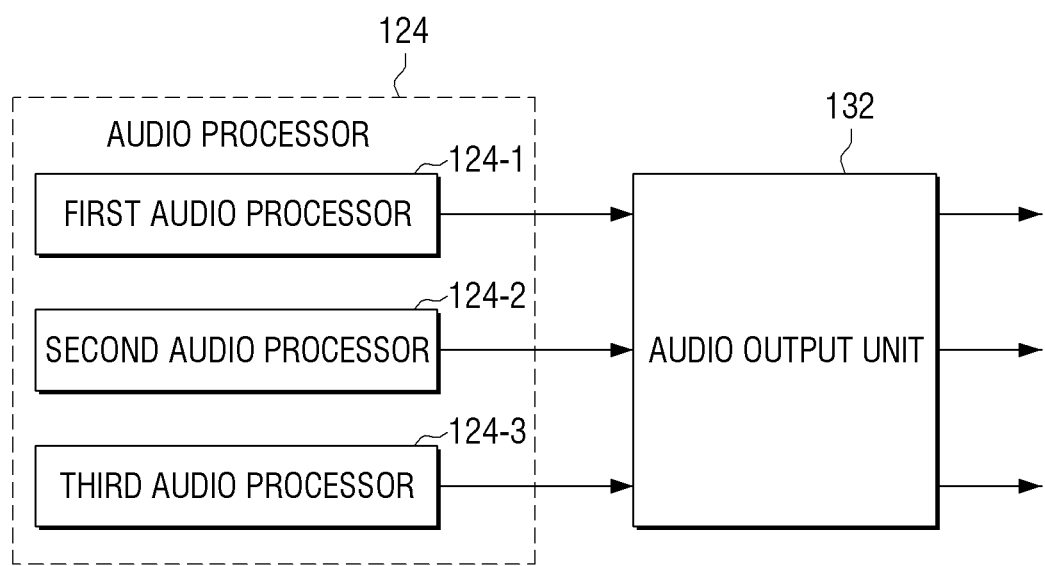
FIG. 8 is a block diagram illustrating a single audio output unit according to an exemplary embodiment.

FIG. 8 is a block diagram illustrating a single audio output unit according to an exemplary embodiment of the present general inventive concept.

As shown in FIG. 8, the single audio output unit 132 is included and may separately process audio signals of audio data of content.

According to an exemplary embodiment, if first through third content are received, the first, second, and third signal processors 120-1, 120-2, and 120-3 modulate audio data of the first through third content into audio signals having different frequency channels through the first, second, and third audio processors 124-1, 124-2, and 124-3 and output the audio signals.

Herein, each audio signal output from the first, second, and third signal processors 120-1, 120-2, and 120-3 has been modulated to a stereo audio signal of 2 channels or corresponding to the number of audio output channels according to the number of audio output channels as described above.

If the modulated audio signals having the different frequency channels are output, the audio output unit 132 may separately transmit the audio signals of the first through third content to eyeglasses apparatuses 200 corresponding to the first through third content.

For example, the audio output unit 132 may output the audio signals of the first through third content according to an RF communication method. As described above, the audio signals of the first through third content may be modulated into signals having different frequency channels. Therefore, the audio output unit 132 may output the audio signals through frequency channels corresponding to the audio signals of the first through third content. In this case, a user who wears the eyeglasses apparatus 200 may select a frequency channel by using a control button of the eyeglasses apparatus 200. According to the selection of the frequency channel, the eyeglasses apparatus 200 may receive an audio signal output through the selected frequency channel and output the audio signal through a speaker, so that the user hears an audio related to a content that the user is currently viewing.

According to another exemplary embodiment, the audio output unit 132 may output the audio signals of the first through third content to the eyeglasses apparatuses 200 according to a Bluetooth communication method which is a wireless communication method. In detail, the audio output unit 132 generates the audio signals of the first through third content as audio signal streams according to Bluetooth communication standards. The audio output unit 132 may transmit the audio signal streams to a plurality of eyeglasses apparatuses 200 based on identification information of the plurality of eyeglasses apparatuses 200 which are paired through the interface unit 150.

Therefore, the plurality of eyeglasses apparatuses 200 may output receive one of the audio signals output through the audio output unit 132 and output the one audio signal stream through a speaker. As a result, users who wear the eyeglasses apparatuses 200 may hear audio related to content that the users are currently viewing, through speakers of the eyeglasses apparatuses.

In the above-described exemplary embodiment, audio signals are output according to a Bluetooth communication method or an RF communication method, but this is only an exemplary embodiment. Therefore, the audio signals may be output according to another communication method.

Figure 9:
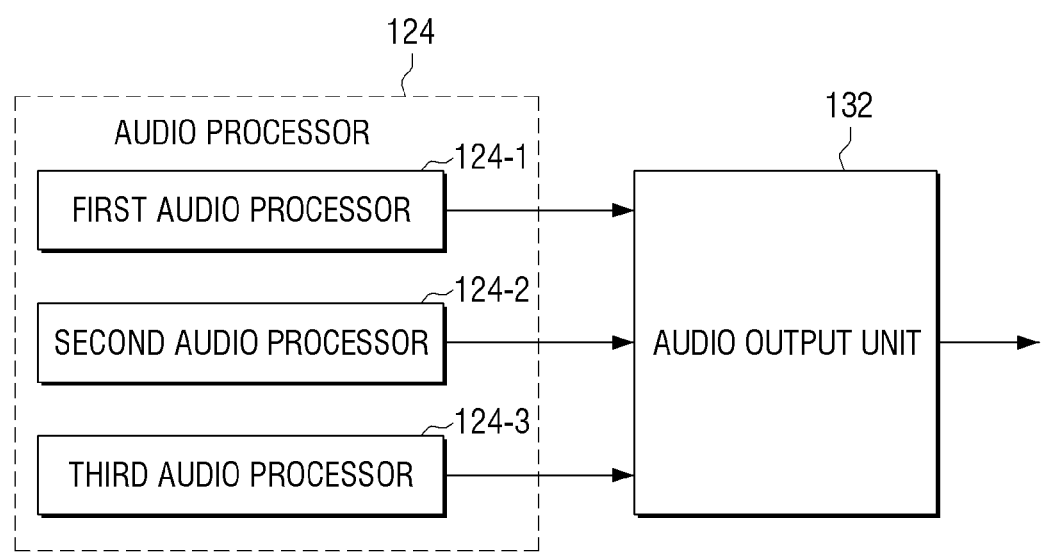
FIG. 9 is a block diagram illustrating a single audio output unit according to another exemplary embodiment.

FIG. 9 is a block diagram illustrating a structure of a single audio output unit according to another exemplary embodiment of the present general inventive concept.

As shown in FIG. 9, the single audio output unit 132 may be included. In this case, the audio output unit 132 generates audio signals of a plurality of content output from the audio processor 124 as one audio signal stream and transmits the one audio signal stream to a plurality of eyeglasses apparatuses 200. In detail, the audio output unit 132 time-divides the audio signals of the plurality of content to generate the audio signal stream. Here, the audio output unit 132 may divide the audio signals of the plurality of content and allocate patterns synchronizing arrangement patterns of image frames of the content to a plurality of time slots to generate the audio signal stream.

According to an exemplary embodiment, if first through third content are received, the first, second, and third signal processors 120-1, 120-2, and 120-3 modulate audio data of the first through third content into audio signals having different frequency channels through the first, second, and third audio processors 124-1, 124-2, and 124-3 and outputs the audio signals.

Herein, an audio signal regarding a plurality of contents output from the audio processor 124 has been modulated to a stereo audio signal of 2 channels or the number of audio output channels according to the number of audio output channels as described above.

If the modulated audio signals having the different frequency channels are output, the audio output unit 132 combines the audio signals of the first through third content according to a time-division method to generate an audio signal stream.

In more detail, the audio output unit 132 divides the audio signals of the first through third content and allocates the audio signals, which are divided into patterns synchronizing with arrangement patterns of image frames combined into a multi-content frame, to a plurality of time slots in order to generate the audio signal stream.

If the audio signals of the first through third content are combined to generate the audio signal stream as described above, the audio output unit 132 may transmit the audio signal stream to a plurality of eyeglasses apparatuses 200 based on identification information of the plurality of eyeglasses apparatuses 200 which are paired through the interface unit 150. If the audio signal stream is received, the eyeglasses apparatus 200 may extract only the audio signal allocated to a pattern corresponding to a display timing among the audio signals of the first through third content and output the extracted audio signal through a speaker. Therefore, a user who wears the eyeglasses apparatus 200 may hear only an audio related to a content that the user is currently viewing, through the speaker of the eyeglasses apparatus 200.

The elements of the display apparatus 100 displaying a single content or a plurality of content, according to the present general inventive concept, have been described in detail. A structure of the eyeglasses apparatus 200 will now be described in detail.

Figure 10:
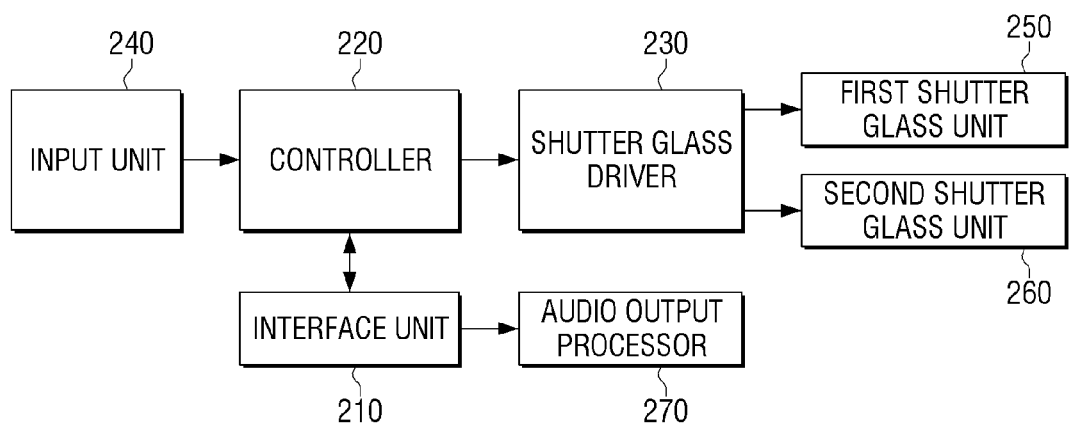
FIG. 10 is a block diagram of an eyeglasses apparatus according to an exemplary embodiment.

FIG. 10 is a block diagram of the eyeglasses apparatus 200, according to an exemplary embodiment of the present general inventive concept.

Referring to FIG. 10, the eyeglasses apparatus 200 operates with the display apparatus 100 which combines and displays a plurality of content views. Also, the eyeglasses apparatus 200 includes an interface unit 210 (e.g., interface), a controller 220, a shutter glass driver 230, an input unit 240 (e.g., input), a first shutter glass unit 250 (e.g., first shutter glass), a second shutter glass unit 260 (e.g., second shutter glass), and an audio output processor 270.

The interface unit 210 performs a communication with the display apparatus 100. According to an exemplary embodiment, the interface unit 210 may be realized as a Bluetooth communication module. In this case, the interface unit 210 may perform a Bluetooth communication with the display apparatus 100 to receive a sync signal having a transmission packet form. Here, a transmission packet includes time information synchronizing with a display timing of a content to turn on/off the first and second shutter glass units 250 and 260 of the eyeglasses apparatus 200. The time information of the transmission packet has been described above in detail, and thus its descriptions will be omitted here.

The controller 220 controls an overall operation of the eyeglasses apparatus 200. In particular, if a user command is input through the input unit 240, the controller 220 controls the shutter glass driver 230 to drive the first and second shutter glass units 250, 260 by synchronizing them with a content view selected by a user command from among a plurality of content views. Specifically, if a user command relating to selection of one content view from among a plurality of content views is input through the input unit 240, the controller 220 receives a sync signal corresponding to the input user command from the display apparatus 100. That is, the controller 220 may select a plurality of content views provided by the display apparatus 100 sequentially whenever a user command is input through the input unit 240. Specifically, as illustrated above with reference to FIG. 2, if a user command is input through the input unit 240, the controller 220 receives a sync signal regarding content 3 from the display apparatus 100, and if a user command is input again, the controller 220 may receive a sync signal regarding content 4 from the display apparatus 100. If a sync signal is received according to a user command, the controller 220 controls the shutter glass driver 230 to drive the first and second shutter glass units 250 and 260.

In accordance with a control command, the shutter glass driver 230 generates the driving signal based on the sync signal received from the display apparatus 100. In particular, the shutter glass driver 230 may open the first and second shutter glass units 250 and 260 according to a display timing of one of a plurality of content displayed by the display apparatus 100, based on the sync signal.

The first and second shutter glass units 250 and 260 turn on or off shutter glasses according to the driving signal received from the shutter glass driver 230. In detail, the first and second shutter glass units 250 and 260 simultaneously open the shutter glasses when one of the plurality of content is displayed and simultaneously close the shutter glass when another content is displayed. Therefore, a user who wears the eyeglasses apparatus 200 may view a video image of one content.

In the case of a 3-dimensional (3D) content, the first and second shutter glasses 250 and 260 may alternately open and close the shutter glasses. In other words, the first shutter glass unit 250 may be opened at a display timing of a left eye image of one 3D content, and the second shutter glass unit 260 may be opened at a display timing of a right eye image of the 3D content, according to the driving signal.

The input unit 240 receives a user control command such as a channel change, a volume adjustment, or the like according to a control of a user. The audio output processor 270 receives an audio signal from the display apparatus 100 and outputs the audio signal through a speaker.

Herein, the audio signal has been modulated to a stereo audio signal of 2 channels or corresponding to the number of audio output channels according to the number of audio output channels of the display apparatus 100 as described above.

According to an exemplary embodiment, if a user command related to an audio frequency channel is input from the user through the input unit 240, the audio output processor 270 may receive select an audio frequency channel corresponding to the user command from among a plurality of audio frequency channels output from the display apparatus 100 and receive an audio signal output through the corresponding audio frequency channel through the interface unit 210. Subsequently, the audio output processor 270 performs signal processing with respect to an audio signal received through the interface unit 210 in an audible sound form and outputs the signal-processed audio signal to a speaker.

According to another exemplary embodiment, the audio output processor 270 may receive an audio signal stream from the interface unit 210. In detail, as described in the exemplary embodiment of FIG. 5, the display apparatus 100 may generate audio signals of a plurality of content as audio signal streams and transmit the audio signal streams to a plurality of eyeglasses apparatuses 200 based on identification information of the plurality of eyeglasses apparatuses 200. In this case, the audio output processor 270 receives one of the audio signal streams of the plurality of content through the interface unit 210. If the audio signal stream is received, the audio output processor 270 signal-processes an audio signal of the received audio signal stream in an audible sound form and outputs the audio signal having the audible sound form through the speaker.

According to another exemplary embodiment, the interface unit 210 may receive an audio signal stream formed of a combination of audio signals of a plurality of content. in this case, the audio output processor 270 performs signal processing an audio signal stream corresponding to a user command input through the input unit 240 in an audible sound form and output the signal-processed audio signal stream to a speaker. That is, the audio output processor 270 extracts only an audio signal allocated to a pattern corresponding to a display timing of one of first through third content among audio signals of the first through third content of the received audio signal stream, signal-processes the extracted audio signal in an audible sound form, and outputs the signal-processed audio signal through the speaker.

Figure 11:
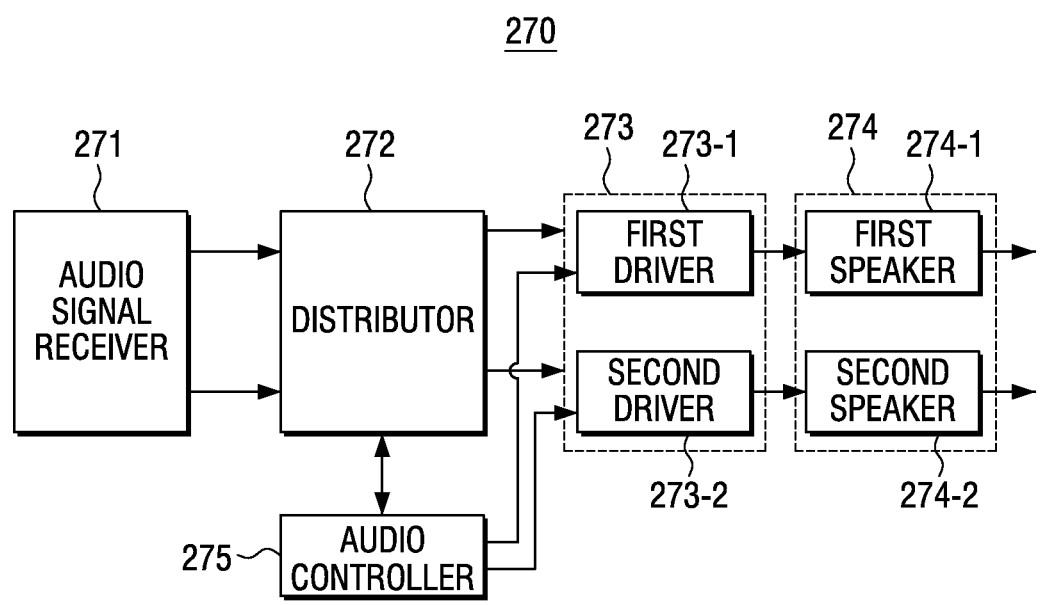
FIG. 11 is a detailed block diagram of an audio output processor of an eyeglasses apparatus according to an exemplary embodiment.

The audio output processor 270 which outputs an audio signal output from the display apparatus 100 through a speaker in the eyeglasses apparatus 200 may be constituted as shown in FIG. 11.

FIG. 11 is a block diagram illustrating a detailed structure of the audio output processor 270 of the eyeglasses apparatus 200, according to an exemplary embodiment of the present general inventive concept.

Referring to FIG. 11, the audio output processor 270 of the eyeglasses apparatus 200 includes an audio signal receiver 271, a distributor 272, a driver 273, a speaker 274, and an audio controller 275.

The audio signal receiver 271 receives an audio signal from the display apparatus 100.

Herein, the audio signal has been modulated to a stereo audio signal of 2 channels or corresponding to the number of audio output channels according to the number of audio output channels of the display apparatus 100 as described above.

The audio signal receiver 271 may receive an audio signal stream in which audio signals regarding a plurality of contents are combined from the display apparatus 100.

According to another exemplary embodiment, if a particular channel is allocated as a communication channel, the audio signal receiver 271 may only an audio signal transmitted through an audio output unit of the display apparatus 100 which performs a communication interface with the corresponding channel. In other words, if the eyeglasses apparatus 200 is paired with the display apparatus 100 according to a Bluetooth communication method to exchange data with the display apparatus 100 according to a Bluetooth method, the audio signal receiver 271 may receive only an audio signal transmitted through a channel which is allocated by the display apparatus 100 and complies with Bluetooth communication standards.

The distributor 272 separates a plurality of audio signals from one audio signal stream and transmits the plurality of audio signals to the driver 273. The distributor 272 may separate the plurality of audio signals of the one audio signal stream. This refers to a frequency filter method which is to select only an audio signal having a particular frequency. Further, if a received audio signal is a stereo audio signal, the distributor 272 may divide the stereo audio signal into one or more audio signals in order to realize a stereophonic sound of the stereo audio signal.

The driver 273 drives the speaker 274 to output the audio signals separated by the distributor 272.

The speaker 274 may include one or more speakers.

In other words, if an audio signal is stereo of 2 channels, a stereophonic sound does not need to be realized. Therefore, one or more speakers output the same stereo audio of 2 channels. If the separated audio signals are stereo signals of channels corresponding to the number of audio output channels, a stereophonic sound is to be realized. Therefore, the one or more speakers output stereo audio having different stereo effects.

If the received audio signal is a stereo audio signal of 2 channels, the audio controller 275 outputs the stereo audio signal of 2 channels through at least one speaker. If the received audio signal is a stereo audio signal of channels corresponding to the number of audio output channels, the audio controller 275 controls the audio signal receiver 271, the distributor 272, the driver 273, and the speaker 274 to output a stereo sound through a plurality of speakers.

According to an exemplary embodiment, the eyeglasses apparatus 200 may output a stereo audio signal through the speaker 274. As described above, if the display apparatus 100 has a less than a predetermined number of audio output channels in a multi-view mode, the display apparatus 100 may audio signals of a plurality of content as stereo audio signals through the audio output unit 132. In this case, the audio signal receiver 271 of the eyeglasses apparatus 200 may receive one of a plurality of stereo audio signals output from the audio output unit 132 of the display apparatus 100. If the stereo audio signal is received, the distributor 272 divides the received stereo audio signal into left and right audio signals and transmits the left and right audio signals to the driver 273. If the audio signal divided into the left and right audio signals is transmitted to the driver 273, the driver 273 may transmit the left and right audio signals to the speaker 274 through first and second drivers 273-1 and 273-2. Therefore, the first to second speakers 274-1, 274-2 may output the left and right audio signals transmitted through the first and second drivers 273-1 and 273-2 as audible sounds and thus, output a stereo audio signal In an exemplary embodiment, the driver 273 is realized as the first and second drivers 273-1 and 273-2 but is not limited thereto. Therefore, the driver 273 may be realized as the single driver 273. In general, left and right audio signals are output through left and right sub-speakers, and a main audio signal is output through a main speaker. This method refers to a 2.1 channel method. Only two speakers, i.e., left and right speakers, are shown in FIG. 11, and this exemplifies that left and right audio signals may be respectively output. However, different channel methods may also be used.

According to another exemplary embodiment, the eyeglasses apparatus 200 may output a stereo audio signal of two channels through the speaker 274.

As described above, if the display apparatus 100 has more than a predetermined number of audio output channels in a multi-view mode, the audio output unit 132 of the display apparatus 100 may output audio signals, which are reduced to be appropriate for a stereo audio signal of 2 channels, as one audio stream, through the first, second, and third audio processors 124-1, 124-2, and 124-3 of the first, second, and third signal processors 120-1, 120-2, and 120-3.

In this case, the audio signal receiver 271 of the eyeglasses apparatus 200 receives an audio signal stream including a plurality of audio signals output from the audio output unit 132. If the audio signal stream including the plurality of audio signals is received, the distributor 220 separates the plurality of audio signals of the received audio signal stream. The distributor 220 transmits an audio signal corresponding to an opening timing of left and right shutter glasses to the driver 273 according to a synchronized one of the plurality of separated audio signals.

Therefore, the speaker 274 may receive the audio signal corresponding to the opening timing of the left and right shutter glasses from the driver 273 according to the synchronized audio signal and output the audio signal as a stereo audio signal of 2 channels.

The elements of the eyeglasses apparatus 200 according to the present general inventive concept have been described in detail. A structure of the remote control device 300 described with reference to FIG. 1 will now be described in detail.

Figure 12:
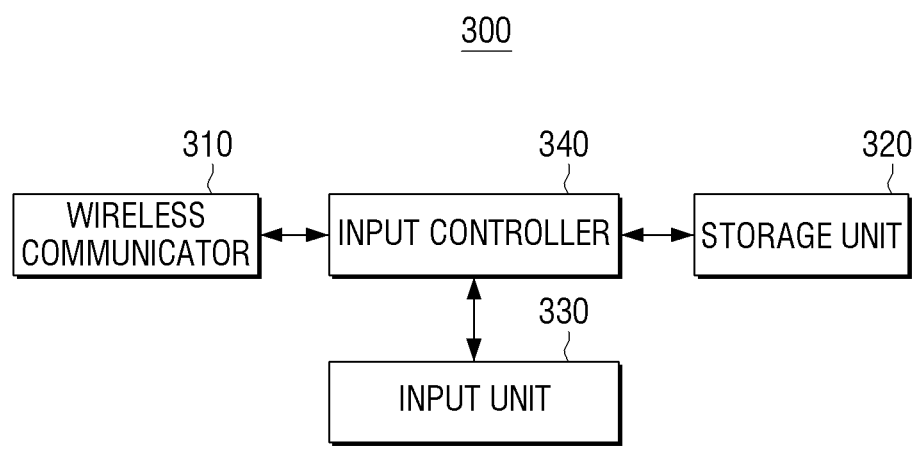
FIG. 12 is a block diagram of an input unit according to an exemplary embodiment.

FIG. 12 is a block diagram illustrating the remote control device 300, according to an exemplary embodiment of the present general inventive concept.

Referring to FIG. 12, the remote control device 300 includes a wireless communicator 310, a storage unit 320 (e.g., a storage), an input unit 330 (e.g., an input), and an input controller 340.

The wireless communicator 310 may be connected to the display apparatus 100 through a wireless communication. The wireless communicator 310 may transmit and receive or may transmit data according to an RF method or an IR method. Here, if a wireless communication method of the input device 300 is the IR method, a one-way wireless communication is performed from the input device 300 to the display apparatus 100. If the wireless communication method of the input device 300 is the RF method, a bidirectional wireless communication is performed between the input device 300 and the display apparatus 100. The RF method may be realized as a bidirectional wireless communication such as a wireless local area network (WLAN), Bluetooth, or the like.

The storage unit 320 stores identification information of the input device 300. Here, the identification information refers to an identification (ID) and refers to various types of identification information for distinguishing an input device of an RF method from other devices. If the input device uses an IR method, the storage unit 320 may be omitted.

The input unit 330 is an input means which is to input a control command for controlling the display apparatus 100. In other words, the input unit 330 may include a plurality of buttons which are function keys having values performing individual functions. The input unit 330 may be realized as one of an electronic button, a mechanical button, and an electrostatic button or a combination thereof.

The input controller 340 transmits the identification information stored in the storage unit 320 to the display apparatus 100 through the wireless communicator 310 to control the storage unit 320 and the wireless communicator 310 in order to perform pairing. If a control command is input through the input unit 330 when the input unit 300 is paired with the display apparatus 100, the input controller 340 controls the wireless communicator 310 to transmit the control command to the display apparatus 100 through the wireless communicator 310. In other words, the input controller 340 controls an overall operation of the input device 300 to allow a user to remotely control one output operation of a plurality of content views.

Operations of the elements of the display apparatus 100, the eyeglasses apparatus 200, and the input device 300 according to the present general inventive concept have been described in detail. A method of outputting audio data of a plurality of content through a display apparatus which displays video data of the plurality of video data will now be described in detail.

Figure 13:
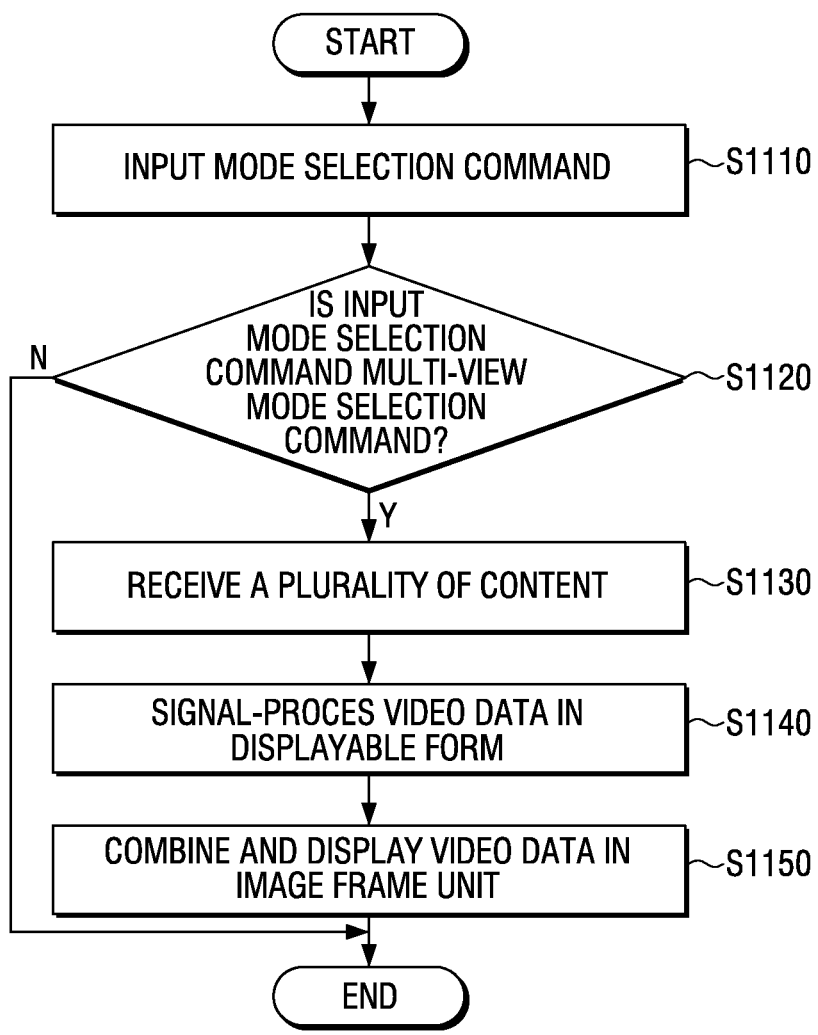
FIG. 13 is a flowchart illustrating a method of displaying video data of a plurality of content through a display apparatus according to an exemplary embodiment.

FIG. 13 is a flowchart illustrating a method of displaying video data of a plurality of content through a display apparatus according to an exemplary embodiment of the present general inventive concept.

Referring to FIG. 13, in operation S1110, the display apparatus which receives a plurality of different content receives one of a single view mode selection command and a multi-view mode selection command from a user. In operation S1120, the display apparatus checks whether an input mode selection command is the multi-view mode selection command. If the input mode selection mode is the single view mode selection mode, the display apparatus only displays content corresponding to the single view mode selection command among the plurality of different content. If the input mode selection command is the multi-view mode selection command, the display apparatus receives the plurality of different content through a plurality of receivers (S 1130).

However, the present general inventive concept is not limited thereto, and the display apparatus may automatically set a single view mode or a multi-view mode according to reception states of the content received through the plurality of receivers. For example, if content is received from one of the plurality of receivers, the display apparatus may automatically set the single view mode. If content are received from at least two or more of the plurality of receivers, the display apparatus may automatically set the multi-view mode.

A technique for signal-processing and outputting data of one content received through the receiver according to the single view mode is well known, and thus its detailed descriptions will be omitted. In the present general inventive concept, an operation of signal-processing and outputting data of a plurality of content received through a plurality of receivers in a displayable form according to a multi-view mode will now be described in detail.

In operation S1140, the display apparatus detects video data and signal-processes the detected video data in a displayable form. The operation of detecting the video data of the plurality of content and signal-processing the video data have been described above in detail, and thus its repeated descriptions will be omitted.

In operation S1150, the display apparatus arranges and displays the signal-processed video data to combine the video data in an image frame unit. In detail, the display apparatus displays combines image frames of the signal-processed vide data to display a multi-content frame. Here, the multi-content frame refers to frame data which is formed so that a plurality of users respectively view a plurality of content. If the multi-content frame is displayed, the display apparatus generates sync signals and transmits the sync signals to eyeglasses apparatuses respectively corresponding to content according to display timings of the content. As described above, the display apparatus may be paired with the eyeglasses apparatuses to transmit the sync signals to the eyeglasses apparatuses. If the display apparatus is paired with the eyeglasses apparatuses, the display apparatus may generate the sync signals as a transmission packet according to wireless communication standards and transmit the transmission packet to the paired eyeglasses apparatuses.

However, the present general inventive concept is not limited thereto, and thus the display apparatus may transmit IR sync signals or RF sync signals having different frequency channels to the eyeglasses apparatuses.

The eyeglasses apparatuses may receive the sync signals through this method and turn on/off left and right shutter glasses according to display timings of the received sync signals, so that users wearing the eyeglasses apparatuses view a video image of one content of a plurality of content. Structures and operations of the eyeglasses apparatuses have been described above in detail, and their repeated descriptions will be omitted herein.

The display apparatus, which receives the plurality of content through the plurality of receives, signal-processes the video data of the plurality of content in a displayable form, and displays the signal-processed vide data, may output audio data of the plurality of content through the follow method.

Figure 14:
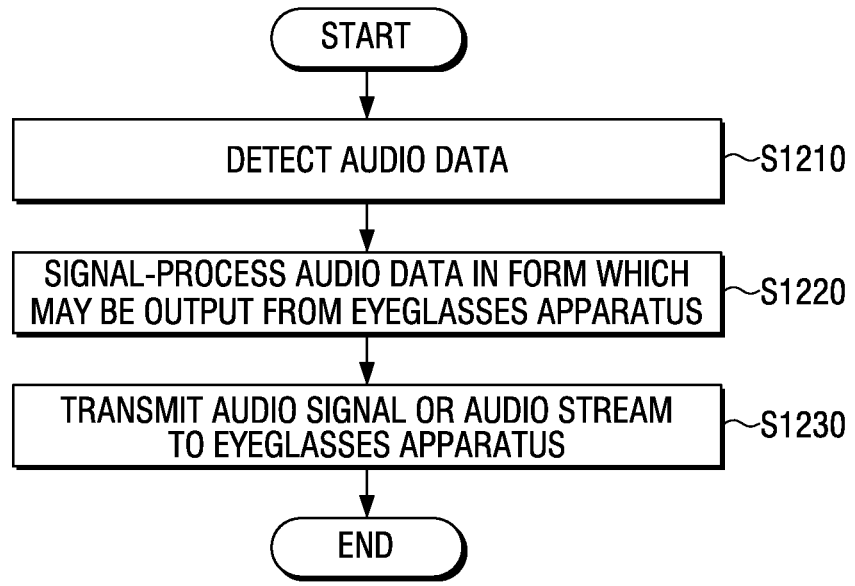
FIG. 14 is a flowchart illustrating a method of outputting audio data of a plurality of content through a display apparatus according to an exemplary embodiment.

FIG. 14 is a flowchart illustrating a method of outputting audio data of a plurality of content through a display apparatus according to an exemplary embodiment of the present general inventive concept.

Referring to FIG. 14, if a plurality of different content is received through a plurality of receivers, the display apparatus detects audio data of the plurality of content in operation S1210. In operation S1220, the display apparatus signal-processes the audio data of the content in a form, which may be output from eyeglasses apparatuses, through audio processors of a plurality of signal processors.

Specifically, if audio data of each content processed in a multi-view mode is data having more than a predetermined number of output channels, a display apparatus performs signal processing with respect to audio data of each content to an audio signal of 2 channels.

For example, as described above with reference to FIG. 5, a display apparatus may output an audio signal to six speakers (the center 510, the woofer 520, the left right fronts 530-1, 530-2, and the left right rears 540-1, 540-2) through 5.1 channels. In this case, the display apparatus performs signal processing with respect only to audio data regarding a specific channel (for example, the left right fronts 530-1, 530-2) from among 5.1 channels. That is, the display apparatus applies a weighted average only to audio data regarding a specific channel (the left right fronts 530-1, 530-2) from among 5.1 channels and performs signal processing thereof. Accordingly, the display apparatus may apply a weighted average to an audio signal output through two channels, that is, the left front 530-1 and the right front 530-2 from among 5.1 channels and output the audio signal.

Meanwhile, if audio data of each content processed in a multi-view mode is data having less than a predetermined number of audio output channels, the display apparatus performs signal processing with respect to audio data of each content to a stereo audio signal.

In operation S1230, the display apparatus transmits audio signals of the content signal-processed by the audio processors to a plurality of eyeglasses apparatuses corresponding to the plurality of content through an audio output unit.

Accordingly, a plurality of eyeglasses apparatuses may output a stereo audio signal regarding one content from among a plurality of contents through a speaker.

Specifically, in the above-mentioned operation S1220, if an audio signal regarding audio data included in each of the signal-processed content is a stereo audio signal, a plurality of eyeglasses apparatuses may output a stereo audio signal regarding one content from among a plurality of contents through a speaker.

A technique for outputting a stereo audio through a speaker of an eyeglasses apparatus has been described above, and thus its detailed description will be omitted herein.

Meanwhile, in the above-mentioned operation S1220, if an audio signal regarding audio data included in each of the processed content is a stereo audio signal of 2 channels, the display apparatus may generate the signal-processed stereo audio signal of 2 channels for each content as a single audio signal stream and transmit the generated audio signal stream to a plurality of eyeglasses apparatuses.

In this case, the plurality of eyeglasses apparatuses may separate the audio signals of the content of the received audio signal stream and output one of the audio signals corresponding to opening timings of left and right shutter glasses as a stereo audio signal of 2 channels through speakers according to sync signals.

A display apparatus according to the present general inventive concept may transmit audio signals of audio data of a plurality of content to eyeglasses apparatuses according to the follow exemplary embodiments.

According to an exemplary embodiment, as described with reference to FIG. 5, the display apparatus may transmit audio signals of a plurality of content to a plurality of eyeglasses apparatuses according to the plurality of content through a plurality of audio output units corresponding to the plurality of audio signals. For example, if audio signals of audio data of first through third content are output, the display apparatus may transmit audio signals of the first through third content to eyeglasses apparatuses corresponding to the first through third content through first through third audio output units.

The first through third audio output units may transmit the audio signals of the first through third content to the eyeglasses apparatuses through a Bluetooth communication method or an RF communication method which is a wireless communication method. A method of transmitting audio signals of first through third content to a plurality of eyeglasses apparatuses through first through audio output units have been described, and thus its repeated descriptions will be omitted herein.

According to another exemplary embodiment, as described with reference to FIG. 6, the display apparatus may separately transmit audio signals of a plurality of content through one audio output unit. As described above, audio signals of first through third content may be modulated into signals having different frequency channels. Therefore, the display apparatus may respectively output the audio signals to frequency channels corresponding to the audio signals of the first through third content through the audio output unit. In this case, a user who wears an eyeglasses apparatus may select a frequency channel by using a control button of the eyeglasses apparatus. According to the selection of the frequency channel, the eyeglasses apparatus may receive the audio signals output through the selected frequency channel and output the audio signals through a speaker. Therefore, the user may hear an audio related to a content that the user is currently viewing.

The audio output unit may output the audio signals of the first through third content to the eyeglasses apparatuses according to a Bluetooth communication method which is a wireless communication method. In detail, the audio output unit generates the audio signals of the first through third content as audio signal streams according to Bluetooth communication standards. After that, the audio output unit may transmit the generated audio signal streams to a plurality of paired eyeglasses apparatuses based on identification information of the plurality of paired eyeglasses apparatuses. Therefore, the plurality of eyeglasses apparatuses may receive one of the audio signal streams output through the audio output unit and output the audio signal stream through speakers. Therefore, users wear the eyeglasses apparatuses may hear audio related content that the users are currently viewing, through the speakers of the eyeglasses apparatuses.

According to another exemplary embodiment, as described with reference to FIG. 7, the display apparatus may generate audio signals of a plurality of content as one audio signal stream through one audio output unit and output the audio signal stream to a plurality of eyeglasses apparatuses. In detail, the display apparatus may combine the audio signals of the plurality of content according to a time-division method through the audio output unit to generate the audio signal stream. Here, the display apparatus divides the audio signals of the plurality of content through the audio output unit and allocates the audio signals as patterns synchronizing with arrangement patters of image frames of the content to a plurality of time slots to generate the audio signal stream. As described above, the audio output unit combines the audio signals of the plurality of content according to the time-division method to generate the one audio signal and performs communications with the plurality of eyeglasses apparatuses according to a wireless communication protocol. For example, the audio output unit may perform communications with the plurality of eyeglasses apparatuses through a Bluetooth communication method which is a wireless communication method. In this case, the plurality of eyeglasses apparatuses may be paired with the display apparatus Therefore, the display apparatus may transmit the audio signal stream to the eyeglasses apparatuses through the audio output unit which performs the communications with the eyeglasses apparatuses according to the Bluetooth communication method. If the audio signal stream is received, the eyeglasses apparatuses may extract only the audio signal allocated to a pattern corresponding to a display timing among the audio signals of the plurality of content of the received audio signal stream and output the extracted audio signal through speakers. Therefore, users wear the eyeglasses apparatuses may hear only audio related content that the users are currently viewing, through the speakers of the eyeglasses apparatuses.

Meanwhile, in the various exemplary embodiments, an audio signal regarding each of a plurality of contents output through an audio output unit has been modulated to a stereo audio signal of 2 channels or channels corresponding to the number of audio output channels according to the number of audio output channels.

Further, a program for performing the methods according to the above-described various exemplary embodiments may be stored on various types of recording media.

In detail, a code for performing the above-described methods may be stored on various types of terminal-readable recording media such as a random access memory (RAM), a flash memory, a read only memory (ROM), an erasable programmable ROM (EPROM), an electronically erasable and programmable ROM (EEPROM), a register, a hard disk, a removable disk, a memory card, a USB memory, a CD-ROM, etc.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus having a multi-view mode to concurrently provide different contents to different viewers, the display apparatus comprising:
a plurality of receivers operable in the multi-view mode to receive a plurality of different contents selected by multiple viewers;
a video processor operable in the multi-view mode to process video data of the plurality of different contents received by the plurality of receivers;
a video output which receives the video data processed by the video processor to display the plurality of different contents;
an audio processor operable in the multi-view mode to process audio data corresponding to the selected contents, received by the receivers; and
an audio output which outputs the processed audio data to a plurality of eyeglasses apparatuses for viewing the plurality of different contents,
wherein a number of channels associated with the processed audio data output to the eyeglasses apparatus is less than a number of channels associated with the audio data received by the receivers.

2. The display apparatus of claim 1, wherein the audio processor processes the audio data by converting surround sound audio data associated with 5.1 or more channels to two-channel-only stereo audio data before being wireles sly transmitted to the eyeglasses apparatuses.

3. The display apparatus of claim 1, further comprising:
a controller which operates according to a mode selected from a single view mode and the multi-view mode and, if the multi-view mode is selected, controls operations of the plurality of receivers, the video processor and each component, and if audio data of the plurality of different content processed in the multi-view mode has less than a predetermined number of audio output channels, controls the audio processor to signal-process each audio data to a stereo audio signal.

4. The display apparatus of claim 3, wherein the audio output comprises the same number of audio outputs as the number of the audio signals.

5. The display apparatus of claim 3, wherein the audio output separately transmits the audio signals of the plurality of different content.

6. The display apparatus of claim 3, wherein the audio output performs communications with the plurality of eyeglasses apparatuses according to a wireless communication protocol, combines the audio signals of the plurality of different content according to a time-division method to generate an audio signal stream, and transmits the audio signal stream to the plurality of eyeglasses apparatuses.

7. The display apparatus of claim 4, wherein the audio output divides the audio signals of the plurality of different content and allocates the audio signals as patterns synchronizing with arrangement patterns of image frames of the plurality of different content to a plurality of time slots in order to generate the audio signal stream.

8. The display apparatus of claim 6, further comprising:
an interface which performs pairing to perform communications with the plurality of eyeglasses apparatuses,
wherein the audio output transmits a plurality of audio signal streams processed by the audio processor to the plurality of eyeglasses apparatuses, respectively, through the interface.

9. A method of controlling a display apparatus, the method comprising:
receiving a plurality of different content;
detecting and processing video data of the plurality of different content;
receiving the video data to arrange and display the plurality of different content in order to combine the plurality of different content in an image frame;
signal-processing audio data of the plurality of different content; and
outputting audio signals of the signal-processed audio data to a plurality of eyeglasses apparatuses corresponding to the plurality of different content,
wherein the signal-processing comprises: if audio data of each content processed in the multi-view mode has more than a predetermined number of audio output channels in a multi-view mode operation, signal-processing each audio data to an audio signal of less than the predetermined number of audio output channels.

10. The method of claim 9, wherein:
the receiving of the plurality of different content comprises: if a multi-view mode selection command is input, receiving the plurality of different content; and
the signal-processing of the audio data comprises: if audio data of each content processed in the multi-view mode has the less than a predetermined number of audio output channels, signal-processing each audio data to a stereo audio signal.

11. The method of claim 10, wherein the audio signals of the plurality of different content are transmitted to the plurality of eyeglasses apparatuses corresponding to the plurality of different content through a plurality of audio outputs corresponding to the plurality of audio signals.

12. The method of claim 10, wherein the audio signals of the plurality of different content are separately transmitted through an audio output.

13. The method of claim 10, wherein the audio signals of the plurality of different content are combined according to a time-division method through an audio output which performs communications with the plurality of eyeglasses apparatuses to generate the audio signal stream and transmit the audio signal stream to the plurality of eyeglasses apparatuses.

14. The method of claim 13, wherein the audio signals of the plurality of different content are divided through the audio output and allocated as patterns synchronizing with arrangement patterns of image frames of the plurality of content to a plurality of time slots to generate the audio signal stream.

15. The method of claim 14, further comprising:
performing pairing with the plurality of eyeglasses apparatuses to perform communications with the plurality of eyeglasses apparatuses,
wherein the audio signal stream of the plurality of different content is transmitted to the plurality of paired eyeglasses apparatuses.

16. A eyeglasses apparatus which is interlocked with a display apparatus displaying a plurality of content views, comprising:
an interface unit which communicates with the display apparatus;
a first shutter glasses unit;
a second shutter glasses unit;
a shutter glasses driver which drives each of the first and the second shutter glasses units based on a sync signal received from the display apparatus;
a shutter glasses unit which drives a shutter in accordance with the driving signal;
an input unit which receives a user command to select a content view;
a controller which, if the user command is input, controls the shutter glasses driver to drive the first and the second shutter glasses units by synchronizing them with a content view selected by the user command from among the plurality of content views; and
an audio output processor which receives an audio signal corresponding to the selected content view and outputs the received audio signal, and
wherein a number of channels associated with the received audio signal output to the eyeglasses apparatus is less than a number of channels associated with the audio data received by the display apparatus.

17. The eyeglasses apparatus as claimed in claim 16, wherein the audio output processor receives the audio signal by selecting an audio frequency channel corresponding to the user command from among a plurality of audio frequency channels output from the display apparatus.

18. The eyeglasses apparatus as claimed in claim 16, wherein the audio output processor processes an audio signal stream corresponding to the user command from among a plurality of audio signal streams transmitted from the display apparatus and outputs the processed audio signal stream.

19. The eyeglasses apparatus as claimed in claim 16, wherein the controller selects the plurality of content views sequentially whenever the user command is input.

20. The eyeglasses apparatus as claimed in claim 16, wherein the audio signal is a stereo audio signal.

* * * * *